(12) United States Patent
Eitan et al.

(10) Patent No.: US 10,673,496 B2
(45) Date of Patent: Jun. 2, 2020

(54) DOUBLE ONE-DIMENSIONAL SECTOR SWEEP SCAN

(71) Applicant: QUALCOMM Incorporated, San Diego, CA (US)

(72) Inventors: Alecsander Petru Eitan, Haifa (IL); Assaf Yaakov Kasher, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/294,141

(22) Filed: Mar. 6, 2019

(65) Prior Publication Data

US 2019/0296804 A1 Sep. 26, 2019

Related U.S. Application Data

(60) Provisional application No. 62/646,792, filed on Mar. 22, 2018.

(51) Int. Cl.
| | |
|---|---|
| *H04B 7/0408* | (2017.01) |
| *H04B 7/0426* | (2017.01) |
| *H04W 72/04* | (2009.01) |
| *H04W 64/00* | (2009.01) |
| *H04B 7/06* | (2006.01) |
| *H04B 7/08* | (2006.01) |

(52) U.S. Cl.
CPC .......... *H04B 7/0408* (2013.01); *H04B 7/043* (2013.01); *H04B 7/0639* (2013.01); *H04B 7/0695* (2013.01); *H04W 64/003* (2013.01); *H04W 72/0446* (2013.01); *H04B 7/063* (2013.01); *H04B 7/086* (2013.01)

(58) Field of Classification Search
CPC .... H04B 7/0408; H04B 7/043; H04B 7/0639; H04B 7/0695; H04B 7/063; H04B 7/086; H04W 64/003; H04W 72/0446
See application file for complete search history.

(56) References Cited

U.S. PATENT DOCUMENTS

| | | | |
|---|---|---|---|
| 2011/0199254 A1 | 8/2011 | Bishop et al. | |
| 2013/0028186 A1* | 1/2013 | Kim | ..................... H04B 7/0617 370/328 |
| 2016/0126753 A1* | 5/2016 | Wight | ..................... H02J 50/40 342/369 |

(Continued)

FOREIGN PATENT DOCUMENTS

WO      2015012492 A1      1/2015

OTHER PUBLICATIONS

International Search Report and Written Opinion—PCT/US2019/021193—ISA/EPO—dated May 20, 2019.

*Primary Examiner* — Sophia Vlahos
(74) *Attorney, Agent, or Firm* — Patterson + Sheridan, LLP

(57) ABSTRACT

Certain aspects of the present disclosure provide methods and apparatus for enhancing a sector sweep. The apparatus generally includes a processing system configured to generate a first set of frames and a second set of frames. The apparatus also includes a first interface configured to output the first set of frames for transmission to a wireless node via a first set of beams, wherein each beam of the first set is wider in a first dimension than a second dimension, and output the second set of frames for transmission to the wireless node via a second set of beams, wherein each beam of the second set is wider in the second dimension than the first dimension.

18 Claims, 12 Drawing Sheets

(56) References Cited

U.S. PATENT DOCUMENTS

2017/0127295 A1    5/2017   Black et al.
2018/0124703 A1*   5/2018   Rune ................. H04W 52/0216
2019/0072659 A1*   3/2019   Gu ........................ G01S 13/726

* cited by examiner

DOUBLE ONE-DIMENSIONAL SECTOR SWEEP SCAN

CROSS-REFERENCE TO RELATED APPLICATION

The present application for patent claims priority to U.S. Provisional Application No. 62/646,792, filed Mar. 22, 2018, which is assigned to the assignee of the present application and hereby expressly incorporated by reference herein in its entirety.

FIELD

Certain aspects of the present disclosure generally relate to wireless communications and, more particularly, systems and methods for improving a sector sweep using a one-dimensional sector sweep.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain wireless communications standards, such as the Institute of Electrical and Electronics Engineers (IEEE) 802.11 standard, denotes a set of Wireless Local Area Network (WLAN) air interface standards developed by the IEEE 802.11 committee for short-range communications (e.g., tens of meters to a few hundred meters).

Amendments 802.11ad, 802.11ay, and 802.11az to the WLAN standard define the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming (BF). An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a first set of frames and a second set of frames. The apparatus also includes a first interface configured to output the first set of frames for transmission to a wireless node via a first set of beams, wherein each beam of the first set is wider in a first dimension than a second dimension, and output the second set of frames for transmission to the wireless node via a second set of beams, wherein each beam of the second set is wider in the second dimension than the first dimension.

Certain aspects of the present disclosure provide an apparatus for wireless communications. The apparatus generally includes a first interface configured to obtain, from a wireless node, a first set of frames transmitted via a first set of beams, wherein each beam of the first set is wider in a first dimension than a second dimension, and a second set of frames transmitted via a second set of beams, wherein each beam of the second set is wider in the second dimension than the first dimension. The apparatus also includes a processing system configured to log reception parameters for the first and second sets of frames and to determine at least one of an angle of departure of the first and second sets of frames, a location of the apparatus relative to the wireless node, or an absolute location of the apparatus.

Aspects of the present disclosure also provide various methods, means, and computer program products corresponding to the apparatuses and operations described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
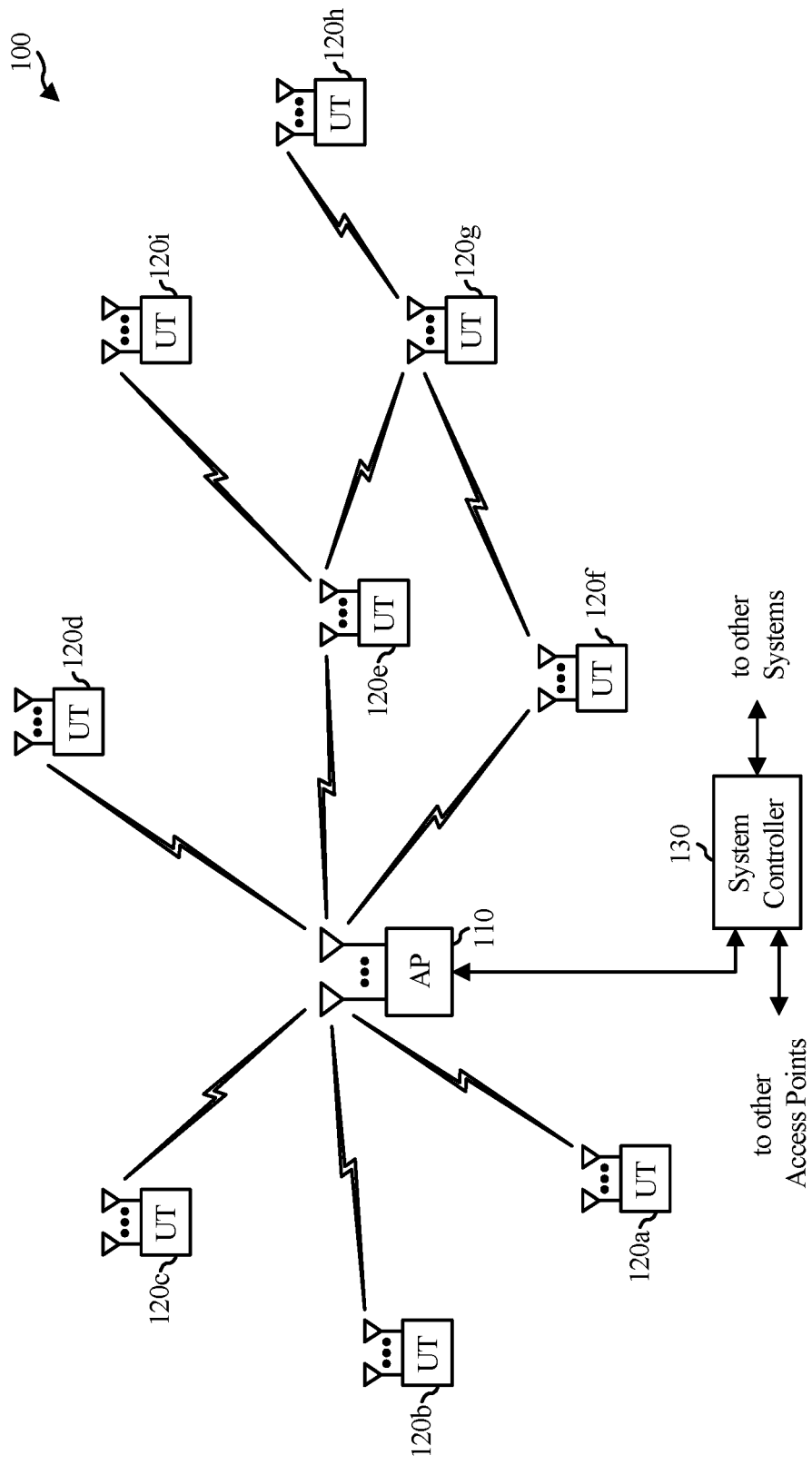
FIG. 1 is a diagram of an example wireless communications network, in accordance with certain aspects of the present disclosure.

Certain aspects of the present disclosure provide methods and apparatus for enhancing a sector sweep using a one-dimensional sector sweep as further described herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("B S"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. Certain aspects of the present disclosure generally relate to improving a sector sweep using a one-dimensional sector sweep. For example, the scanning time to perform a sweep may be reduced using a one-dimensional sector sweep between access points and/or user terminals as further described herein with respect to FIGS. 6-10.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
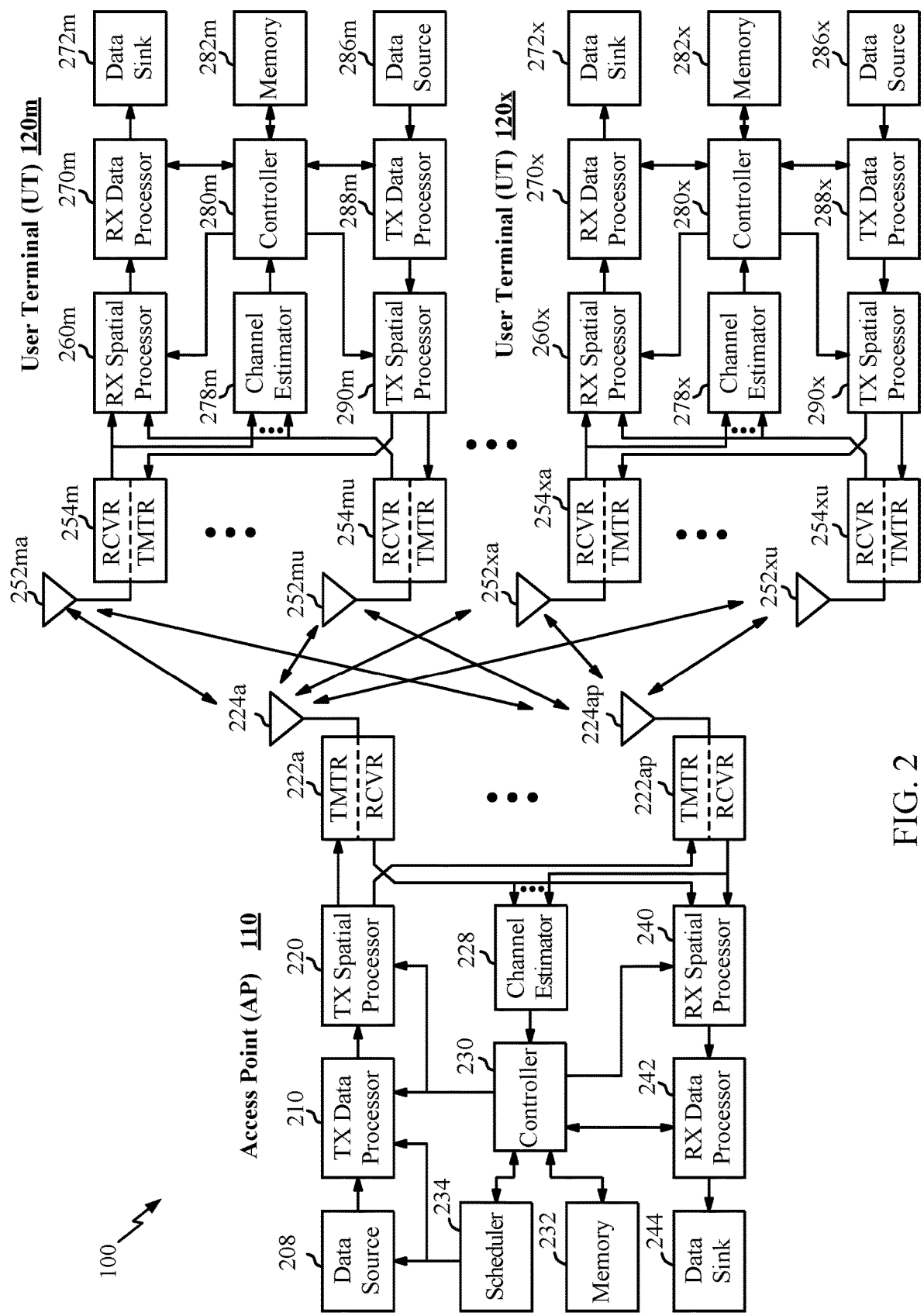
FIG. 2 is a block diagram of an example access point and example user terminals, in accordance with certain aspects of the present disclosure.

FIG. 2 illustrates a block diagram of access point 110 and two user terminals 120m and 120x in MIMO system 100. In certain aspects, the access point 110 and/or the user terminals 120m and 120x may perform one-dimensional sector sweep scans, for example, to perform beamforming training as further described herein with respect to FIGS. 6-10.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain standards, such as the IEEE 802.11ay standard, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
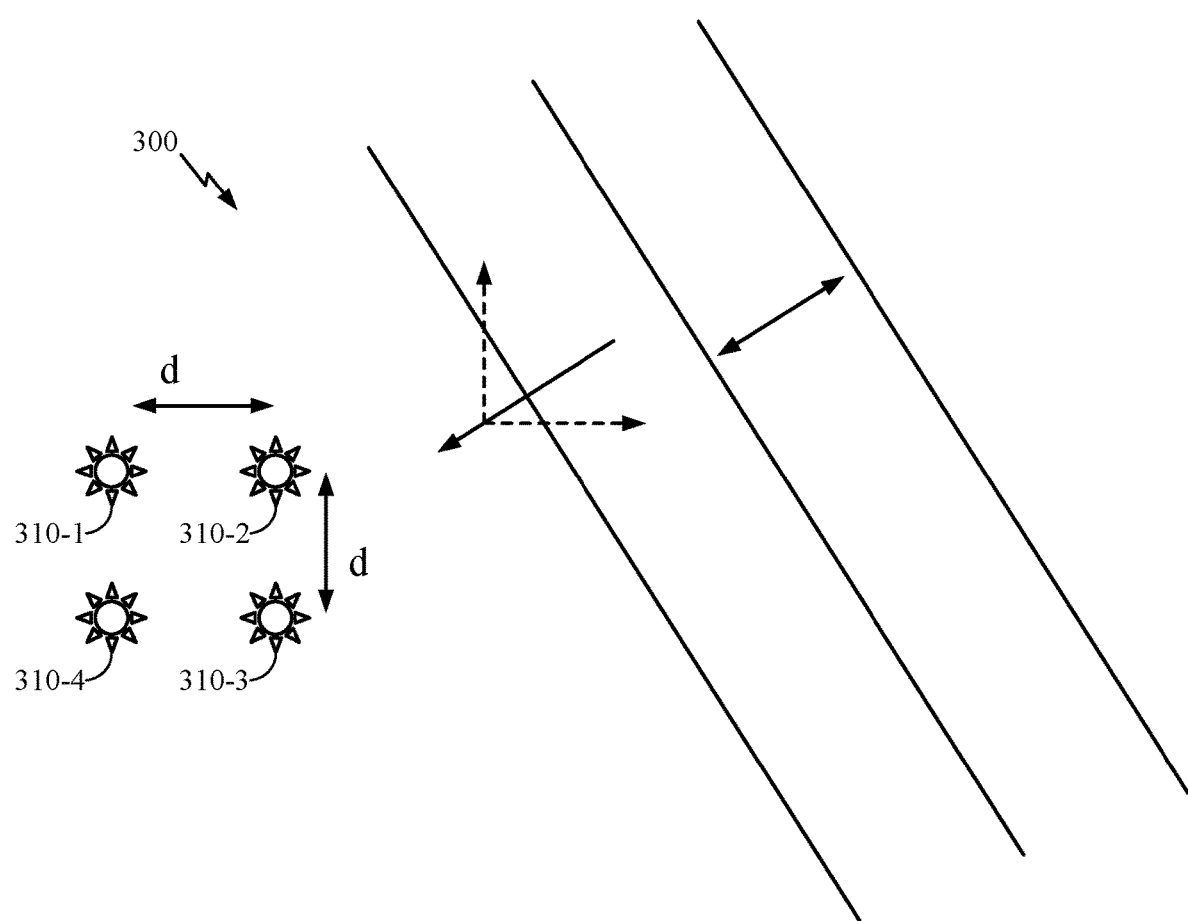
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

In high frequency (e.g., mmWave) communication systems like 60 GHz (e.g., 802.11ad, 802.11ay, and 802.11az), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication. As will be described in greater detail below, in some cases, a one-dimensional sector may be formed using beamforming.

Figure 4:
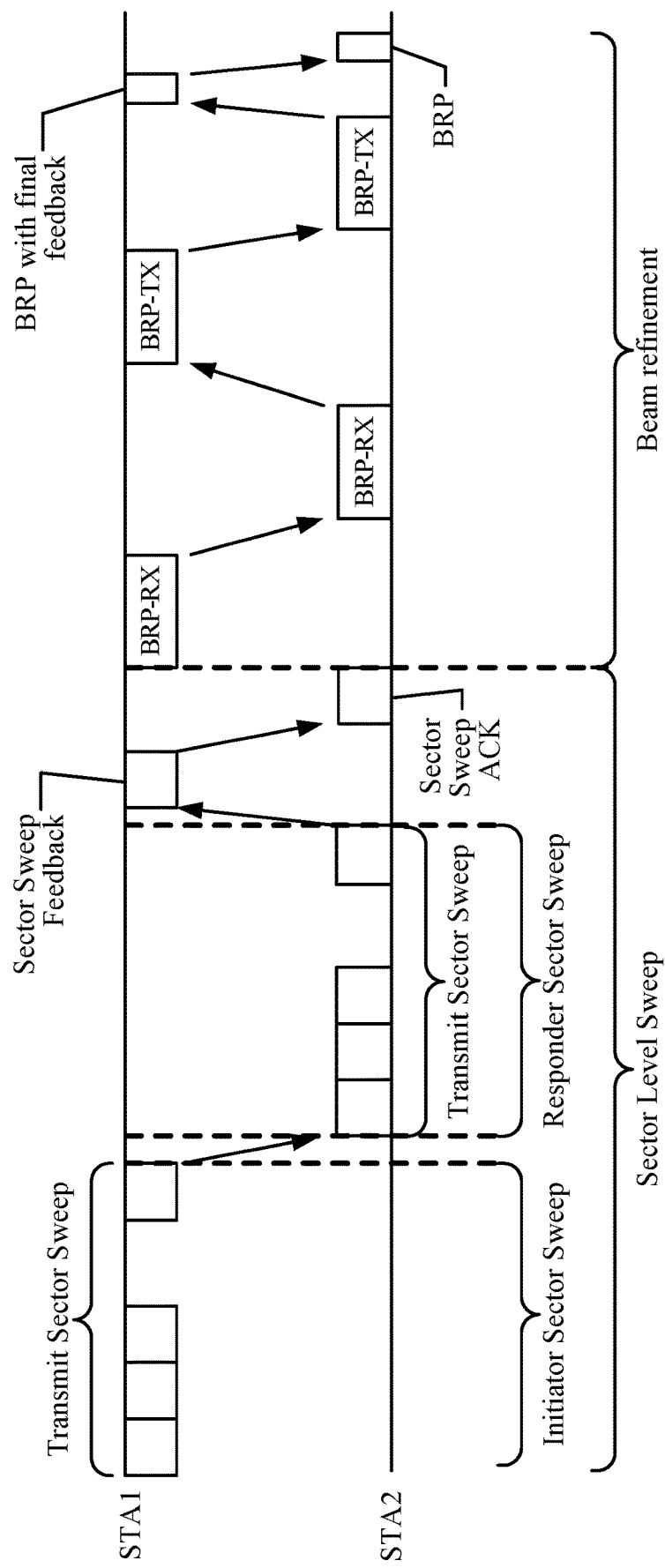
FIG. 4 illustrates an example beamforming training procedure, in accordance with certain aspects of the present disclosure.

As illustrated in FIG. 4, BF training typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission is sent using a different sector (covering a directional beam of a certain width) identified in the frame and provides the necessary signaling to allow each STA to determine appropriate antenna system settings for both transmission and reception.

As illustrated in FIG. 4, in all cases where the AP has large number of elements, the sectors used are relatively narrow, causing the SLS (Sector Level Sweep) process to be long. The higher the directivity more sectors are needed and therefore the SLS is longer. As an example, an AP with an array of 100 antenna elements may use 100 sectors. This situation is not desired since SLS is an overhead, which affects throughput, power consumption, and induces a gap in the transport flow. Thus, the SLS contributes to latency and power consumption.

Figure 5:
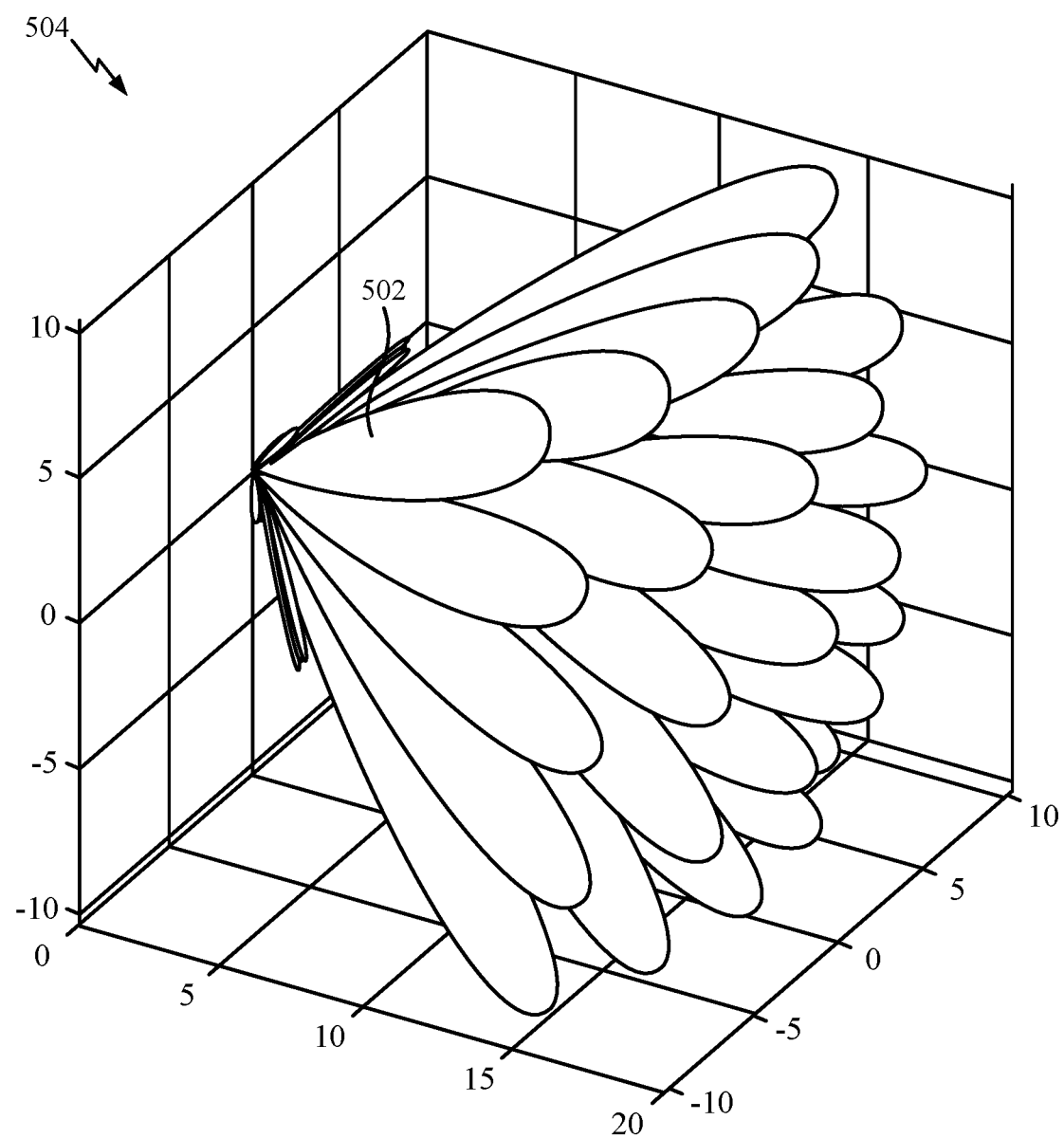
FIG. 5 illustrates an example radiation pattern of "pencil" beams, in accordance with certain aspects of the present disclosure.

Various techniques may be used to try and reduce the SLS duration. For example, each Sector Sweep (SSW) frame may have a duration of about 15 microseconds and transmitted via a pencil beam 502 as illustrated in FIG. 5, which depicts an example radiation pattern of pencil beams 504, in accordance with certain aspects of the present disclosure. With a transmitter having 256 pencil beam sectors (of which only 25 are shown in FIG. 5), the sector sweep may take about 3.8 milliseconds. A shorter SSW (SSSW) message (e.g., 9.6 microseconds) may be used, which may save some time (e.g., about 36%), but this still results in the 256-pencil-beam example taking about 2.5 milliseconds to complete the sector sweep.

In some cases, throughput may be reduced by utilizing the fact that in such APs the transmitter can transmit via several RF chains. This facilitates transmission in parallel on several single channels. It can shorten the scan by the number of frequencies (2 or 3 or 4). Unfortunately, this approach may require the receiver to support the multiple frequencies scan, and it is not backward compatible (e.g., with 802.11ad devices) and requires the stations to fully be aware of this special mode in advance. In some cases, the Tx SLS+Rx SLS or the Tx SLS+Rx BRP may be replaced with a new Tx+Rx BRP where only one "very" long BRP message is used with many TRN units. Unfortunately, this method requires a very long message but may be able to support multiple STAs in parallel, making it efficient but only in cases with a large number of STAs.

Example Double One-Dimensional Sector Sweep Scan

Aspects of the present disclosure provide techniques that may allow for an enhanced sector sweep that utilizes two or more one-dimensional sector sweep scans. As noted above, a conventional sector sweep may take too long for wireless devices with hundreds of pencil beam sectors (e.g., 256, 512, or 1024). Certain aspects presented herein, address the sweep duration by sweeping a coverage area using wide one-dimensional sectors. For example, suppose an AP has N sectors formed by an antenna array having K×L antenna elements (where N=K×L). A pencil beam scan as previously described requires N messages to be sent, each in a different direction. The sector sweep of the present disclosure may be performed for each row and column of the antenna array, yielding a sector sweep having (K+L) one-dimensional sectors, reducing the scanning time significantly. In some instances, the sector sweep may be reduced by a factor of 16, for example, where N=1024, K=32, and L=32. Such a sector sweep may be used for improving beamforming training and/or device positioning applications (e.g., passive positioning) as further described herein.

Figure 6:
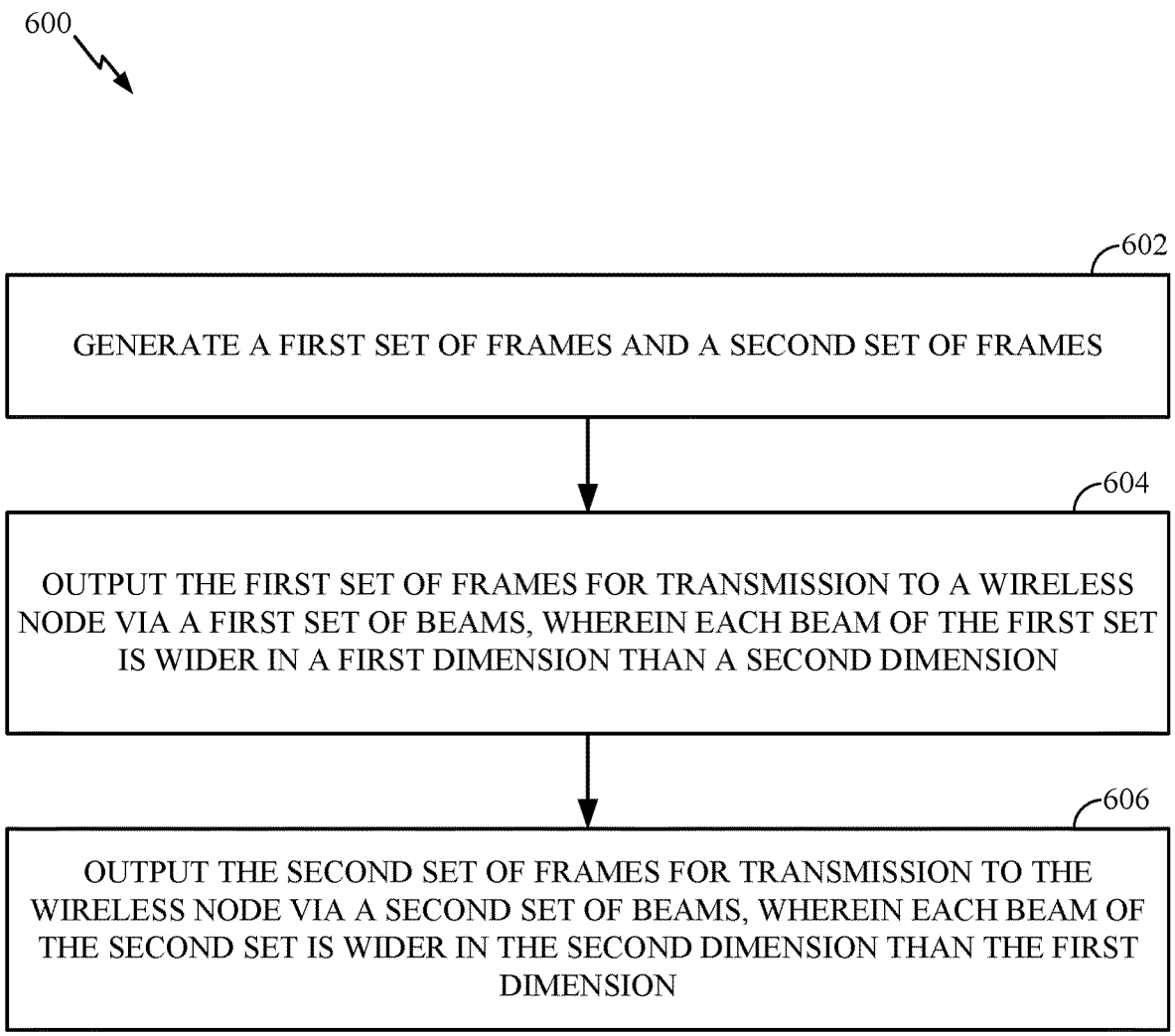
FIG. 6 illustrates example operations for performing a one-dimensional sector sweep by a sweep initiator, in accordance with certain aspects of the present disclosure.

FIG. 6 illustrates example operations 600 for performing one-dimensional sector sweeps, in accordance with certain aspects of the present disclosure. The operations 600 may be performed, for example, by an AP (e.g, AP 110) or a STA (e.g., user terminal 120). Operations 600 may be implemented as software components that are executed and run on one or more processors (e.g., controller 230 of FIG. 2). In certain aspects, the transmission and/or reception of signals by the AP may be implemented via a bus interface of one or more processors (e.g., controller 230) that obtains and/or outputs signals. Further, the transmission and reception of signals by the AP of operations 600 may be enabled, for example, by one or more antennas and/or transmitter/receiver unit(s) (e.g., antenna(s) 224 or transmitter/receiver unit(s) 222 of FIG. 2).

The operations 600 begin, at 602, by the AP or STA (also referred to herein as a "sweep initiator") generating a first set of frames and a second set of frames. At 604, the AP or STA outputs the first set of frames for transmission to a wireless node (e.g., user terminal 120 or another AP, also referred to herein as a "sweep receiver") via a first set of beams, wherein each beam of the first set is wider in a first dimension than a second dimension. At 606, the AP or STA outputs the second set of frames for transmission to the wireless node via a second set of beams, wherein each beam of the second set is wider in the second dimension than the first dimension.

Figure 7:
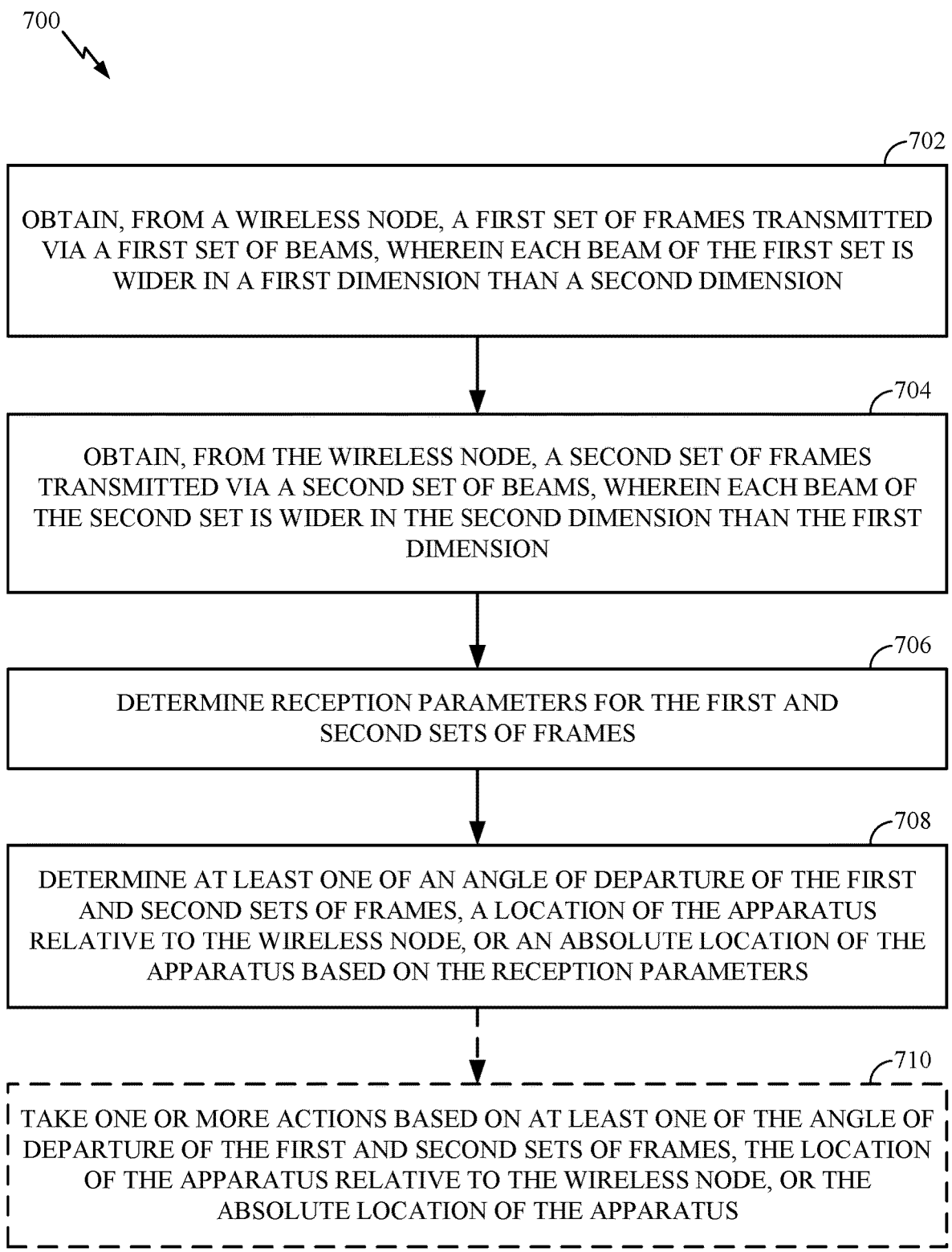
FIG. 7 illustrates example operations for performing a one-dimensional sector sweep by a sweep receiver, in accordance with certain aspects of the present disclosure.

The sweep receiver may use the received one-dimensional sector sweep frames to determine an angle of departure (AoD) of the frames and/or a location of the sweep receiver as further described herein. For example, FIG. 7 illustrates example operations 700 for receiving the one-dimensional sector sweep frames, in accordance with certain aspects of the present disclosure. The operations 700 may be performed, for example, by a STA (e.g., user terminal 120) or an AP (e.g., AP 110). Operations 700 may be implemented as software components that are executed and run on one or more processors (e.g., controller 280 of FIG. 2). In certain aspects, the transmission and/or reception of signals by the STA may be implemented via a bus interface of one or more processors (e.g., controller 280) that obtains and/or outputs signals. Further, the transmission and reception of signals by the STA of operations 700 may be enabled, for example, by one or more antennas and/or transmitter/receiver unit(s) (e.g., antenna(s) 252 or transmitter/receiver unit(s) 254 of FIG. 2).

The operations 700 begin, at 702, by the AP or STA (also referred to herein as a "sweep receiver") obtaining, from a wireless node (e.g., the sweep initiator of operations 600), a first set of frames transmitted via a first set of beams, wherein each beam of the first set is wider in a first dimension than a second dimension. At 704, the AP or STA, from the wireless node, obtains a second set of frames transmitted via a second set of beams, wherein each beam of the second set is wider in the second dimension than the first dimension. At 706, the AP or STA determines reception parameters for the first and second sets of frames. At 708, the AP or STA determines at least one of an angle of departure of the first and second sets of frames, a location of the apparatus relative to the wireless node, or an absolute location of the apparatus based on the reception parameters. At 710, the AP or STA may, optionally, take one or more actions based on at least one of the angle of departure of the first and second set of frames, the location of the STA relative to the wireless node, or the absolute location of the STA.

Figure 8:
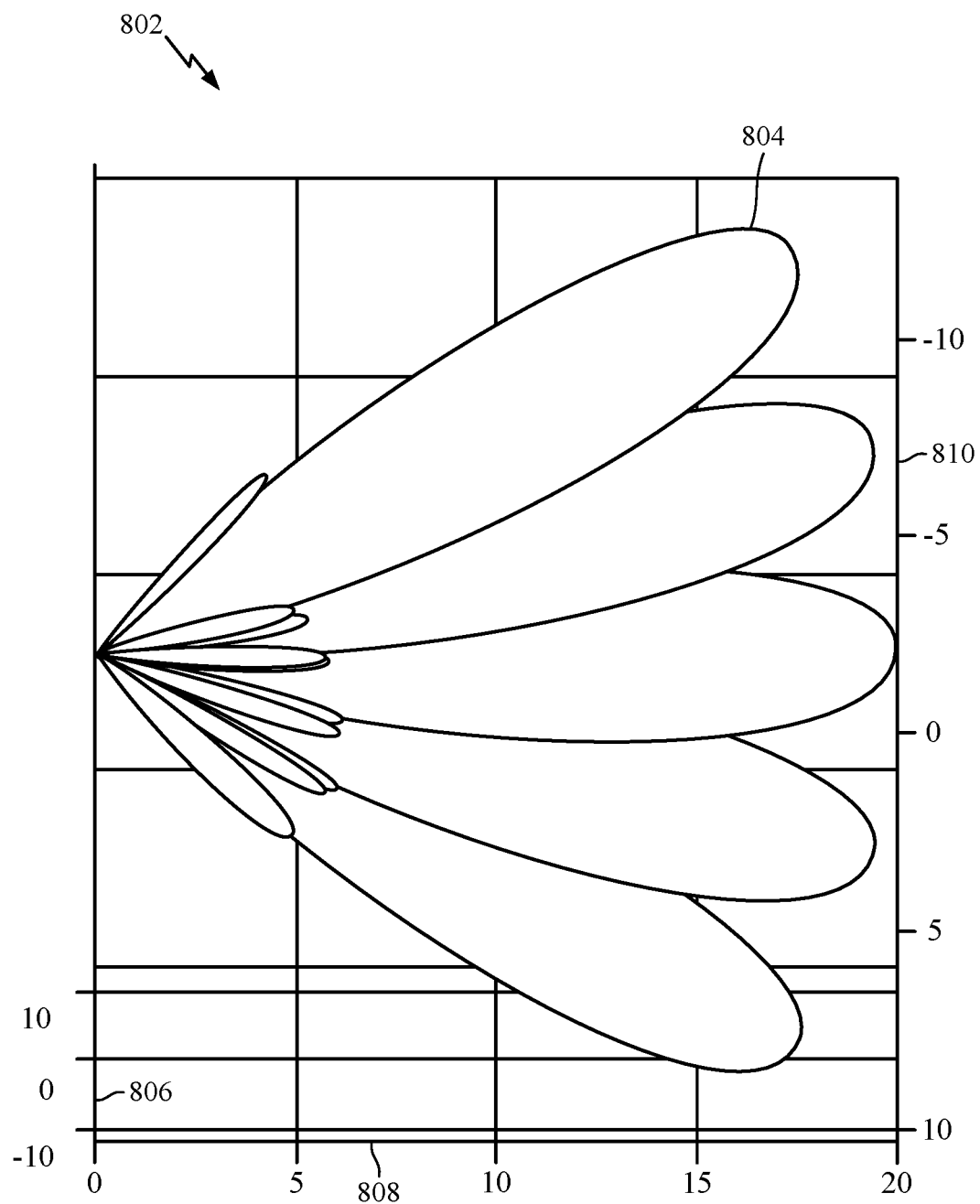
FIG. 8 illustrates an example radiation pattern of elevation beams, in accordance with certain aspects of the present disclosure.

As noted above, during the one-dimensional sweep, a first set of one-dimensional sector sweep (SSW) frames is transmitted via beams that have a wider first dimension than a second dimension. In certain aspects, this first set of beams may correspond to different elevation directions (or angles). For example, FIG. 8 illustrates an example radiation pattern of one-dimensional elevation beams 802, in accordance with certain aspects of the present disclosure. The elevation beams 802 are depicted in a coordinate system having an x-axis 806, y-axis 808, and z-axis 810. Each elevation beam 804 has a beam pattern that is wider in the azimuthal dimension than the elevation dimension. In other words, each elevation beam 804 has a wider equatorial dimension than the dimension of its poles. Each elevation beam 804 may dip at a different angle relative to a reference plane (e.g., a horizontal plane that runs parallel to the x-axis 806 and the y-axis 808) or relative to another elevation beam. Each beam of the elevation beams 802 may correspond to a different transmit direction along the first dimension that is associated with a different angle in the narrower elevation dimension (e.g., the set of beams transmitted at 604).

Figure 9:
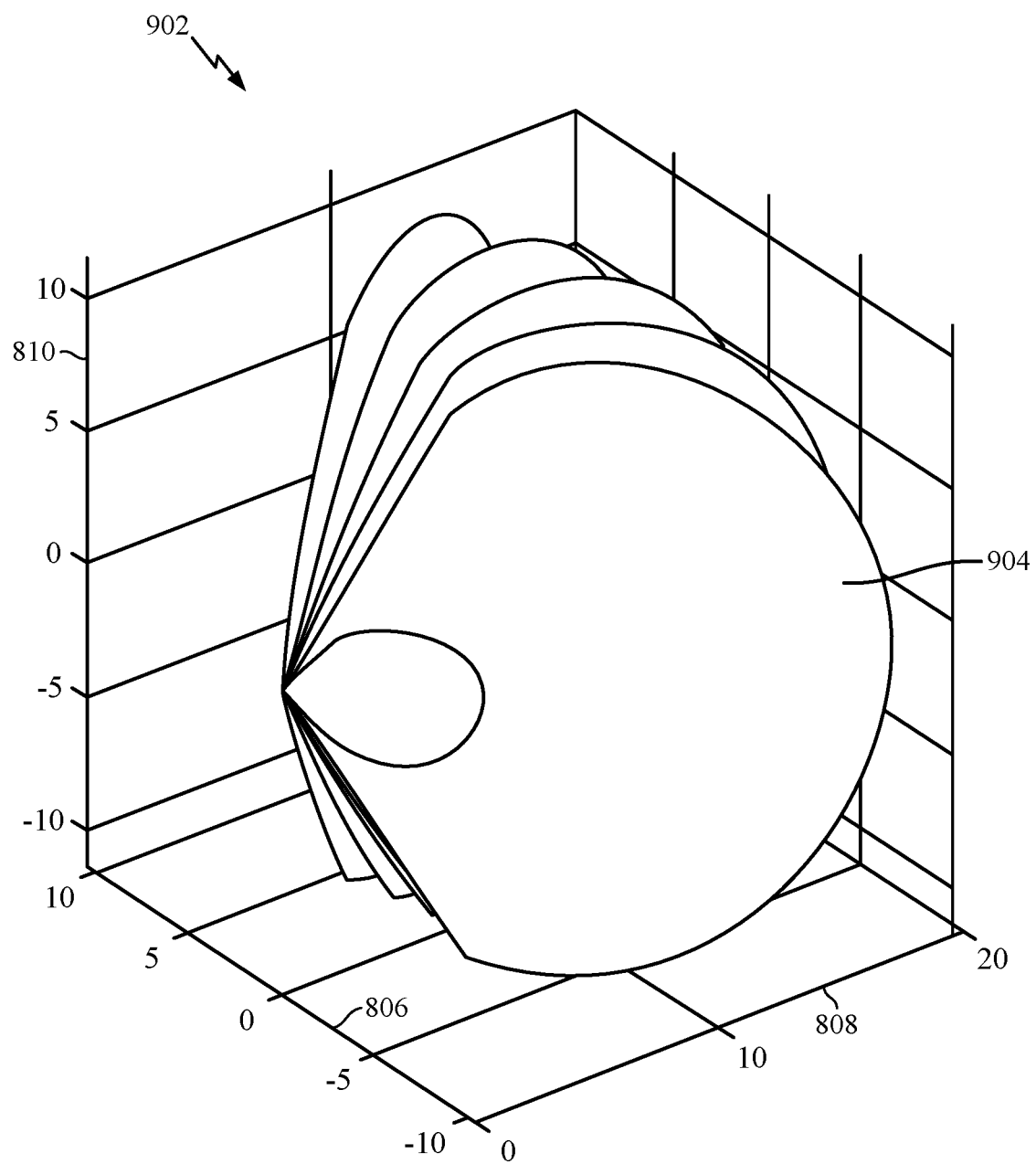
FIG. 9 illustrates an example radiation pattern of azimuthal beams, in accordance with certain aspects of the present disclosure.

As noted above, a second set of frames are transmitted via beams that have a wider second dimension than the first dimension. In certain aspects, this second set of beams may correspond to different azimuthal directions. For example, FIG. 9 illustrates an example radiation pattern of one-dimensional azimuthal beams 902, in accordance with certain aspects of the present disclosure. The azimuthal beams 902 are depicted in the three-dimensional coordinate system (x-axis 806, y-axis 808, and z-axis 810). Each azimuthal beam 904 has a beam pattern that is wider in the elevational dimension than the azimuthal dimension. In other words, the azimuthal beam 904 has a wider dimension at its poles than the equatorial dimension. Each azimuthal beam 904 may be spaced at a different azimuthal direction relative to a reference plane (e.g., a vertical plane that runs parallel to the y-axis 808 and the z-axis 810) or relative to another azimuthal beam. Each beam of the azimuthal beams 902 may correspond to a different transmit direction along the first dimension that is associated with a different angle in the narrower azimuthal dimension (e.g., the set of beams transmitted at 606).

In certain aspects, the first set of beams collectively spans approximately a same coverage area as the second set of beams. For example, the elevation beams 802 spans approximately the same coverage area as the azimuthal beams 902. As shown, the elevation beams 802 are orthogonal to the azimuthal beams 902. In certain aspects, the elevation beams and the azimuthal beams may not be orthogonal to each other. For example, the elevation beams 802 may be tilted relative to the y-axis 808. In another example, the azimuthal beams 902 may be tilted relative to the z-axis 810. In certain aspects, the first set of beams (e.g., the set of beams transmitted at 604) may include elevation and/or azimuthal beams. Similarly, the second set of beams (e.g., the set of beams transmitted at 606) may include elevation and/or azimuthal beams.

In certain aspects, the sweep initiator may initially provide the sweep receiver with directional information related to each one-dimensional sector used in the one-dimensional sector sweeps. For example, the sweep initiator may transmit to the sweep receiver a frame including information indicative of angular directions (e.g., angles of departure) for sets of beams (e.g., the elevation beams 802 and the azimuthal beams 902) used during the one-dimensional sector sweep. That is, the sweep receiver may obtain at least one frame with information regarding the directional mapping of the beam indexes in the first set of frames and the directional mapping of the beam indexes in the second set of frames. In certain aspects, the sweep receiver may initially obtain the directional information via a common database or common server on the web. For example, the sweep receiver may obtain the directional information from a server or another wireless node (e.g., an AP or STA different from the sweep initiator) that collects the directional information for multiple APs.

In certain aspects, the angular directions may be relative to a common coordinate reference system (such as a latitude, longitude, and/or elevation). The directional information may correspond to indices that identify the one-dimensional sectors of the sweep initiator. That is, the directional information may be a data structure including indices that map to angular directions. The directional information may also indicate the coordinate reference system of the angular directions. In certain aspects, the directional information may be included in location configuration information (LCI) message. The directional information may also indicate to the sweep receiver that the sweep initiator is capable of performing a one-dimensional sector sweep as described herein.

In certain aspects, each of the one-dimensional sector sweep frames may include a beam index indicating which one-dimensional beam was used to output the sector sweep frame for transmission. That is, each frame of the first and second sets has a beam index indicating a beam via which the frame was output for transmission. For example, each beam index in the first set of frames may map to an angle of departure from the sweep initiator in the second dimension, whereas each beam index in the second set of frames may map to an angle of departure from the sweep initiator in the first dimension. The sweep receiver may use this beam index to determine the angular direction from which the frame was sent by the sweep initiator based on the previously received directional information. In other words, the sweep receiver may determine the angle of departure (AoD) of each one-dimensional sector sweep frame received based on a combination of the beam index of at least one of the first set of frames and the beam index of at least one the second set of frames. For example, the sweep receiver may determine the AoD of each sweep sector frame based on the beam indices and the previously received directional information corresponding to the beam indices.

The sweep receiver may also determine the angle of departure (AoD) based on at least one of: an interpolation between two of the angles in the second dimension or an interpolation between two of the angles in the first dimension. For example, the sweep receiver may interpolate the angle of departure for the azimuthal direction between the two strongest received signals from the azimuthal beams 902. The sweep receiver may perform a similar interpolation to estimate the angle of departure for the elevation direction between the two strongest received signals from the elevation beams 802.

In certain aspects, each frame of the first and second sets includes an identification of the sweep initiator. For example, each frame of the first and second sets may have an index identifying the sweep initiator. The sweep receiver may determine an absolute location of the sweep initiator based on this identification and the AoD of the sweep frames.

In certain aspects, the sweep receiver may provide feedback to the sweep initiator. The feedback may include information generated based on reception parameters determined by the sweep receiver (e.g., at 706) for the first and second sets of one-dimensional sector sweep frames. In certain aspects, the feedback information generated may be an indication of the received signal strength of the one-dimensional sectors received by the sweep receiver. That is, the reception parameters may include an indication of the received signal strengths for the received sector sweep frames.

For example, the sweep receiver may generate a feedback frame including information regarding the reception parameters determined at 706. The sweep receiver outputs the feedback frame for transmission to the sweep initiator. The sweep receiver obtains from the sweep initiator, a response frame. The sweep initiator determines the AoD of the frames based on information included in the response frame. This may enable the sweep receiver to offload the determination to the sweep initiator or another device.

The sweep initiator may determine, based on the received feedback information, at least one of an angle of departure of the first and second one-dimensional sector sweep frames at the sweep receiver, a location of the sweep receiver relative to the sweep initiator, or an absolute location of the sweep receiver. For example, the sweep initiator may determine the AoD based on the indications of the received signal strengths at the sweep receiver corresponding to the one-dimensional sectors. The sweep initiator may use the AoD for configuring its antenna elements to directionally transmit signals to the sweep receiver.

As noted above, the sweep receiver may take one or more actions based on various parameters (e.g., the angle of departure of the first and second sets of frames, the location of the sweep receiver relative to the sweep initiator, or the absolute location of the sweep receiver) determined by the sweep receiver. In certain aspects, the one or more actions may include changing an antenna configuration of the sweep receiver. For instance, the sweep receiver may configure its receive antenna elements for directional reception based on an angle of departure. The one or more actions may also include using, for example, the angle of departure of the first and second sets of frames, the relative location of the sweep receiver relative to the sweep initiator, or the absolute location of the sweep receiver for location based services such as a navigation service. The one or more actions may include reporting, for example, the location of the sweep receiver relative to the sweep initiator or the absolute location of the sweep receiver to a higher layer application (such as a navigation application) or another device (such as a server monitoring the location of the sweep receiver).

Aspects of the present disclosure provide techniques where a station may perform positioning (e.g., passive positioning) based on a departure direction, which may be represented as an angle of departure (AoD), of the one-dimensional sector sweep frames.

Figure 10:
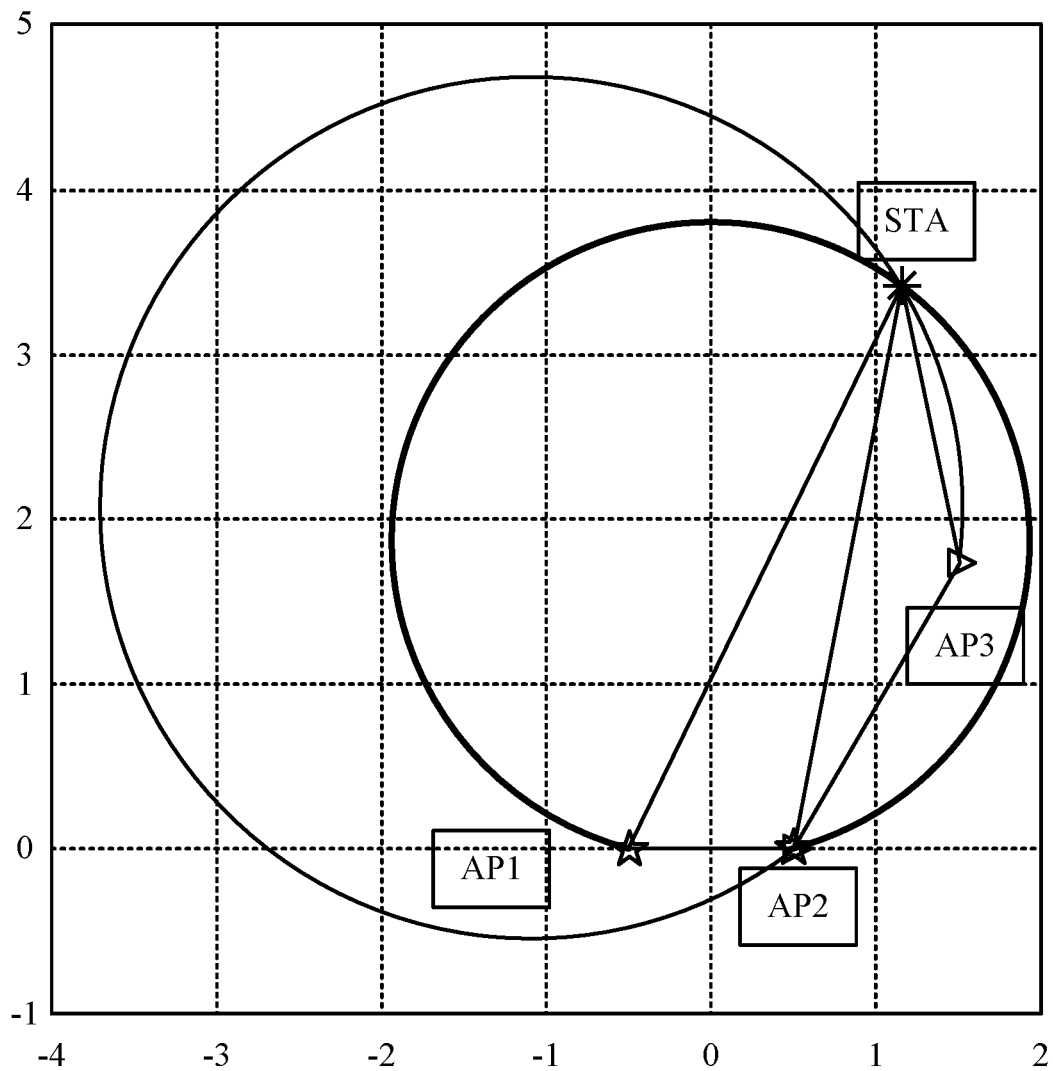
FIG. 10 illustrates an example wireless system for determining positioning, in accordance with certain aspects of the present disclosure.

As illustrated in FIG. 10, using the AoDs from two different APs the difference angle of pointing vectors to these APs can be found. As illustrated in FIG. 10, this defines a section of a circle (in 3 dimensions, a sphere). In two dimension, if the AP sits at points (in the x,y plain—(−d/2, 0), (d/2), the circle can be parametrically defined as $$x = \frac{D}{\sin(\theta)} \sin(\alpha + \theta)\cos(\alpha) - \frac{D}{2}, \ y = \frac{D}{\sin(\theta)} \sin(\alpha + \theta),$$

where θ is the angle between directions and 0<α<π−θ is a running parameter. FIG. 10 shows how circles are formed from specific angles and the base lines which are the lines connecting the APs. The (2-D) position of the STA (within a plane) may be found as an intersection of the two circles (e.g., given the equations as defined above). As the intersection is at two points, information from the third AP may be used to resolve which of the two intersecting points to use for the position estimate. In this manner, 3 APs may allow estimation of location in a plane, while 4 APs allow location estimation in 3 dimensions. Similarly, 4 APs may allow the (3-D) position of the STA to be found as an intersection of three (or four) spheres (e.g., given corresponding parametrically defined equations).

Techniques described herein provide various advantages to scanning sectors, in particular, for mmWave applications with transmitters having hundreds of antenna elements. For example, the one-dimensional sector sweep described herein may enable transmitters to significantly reduce a sector sweep duration, which may also improve beamforming training and positioning applications.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 6A:
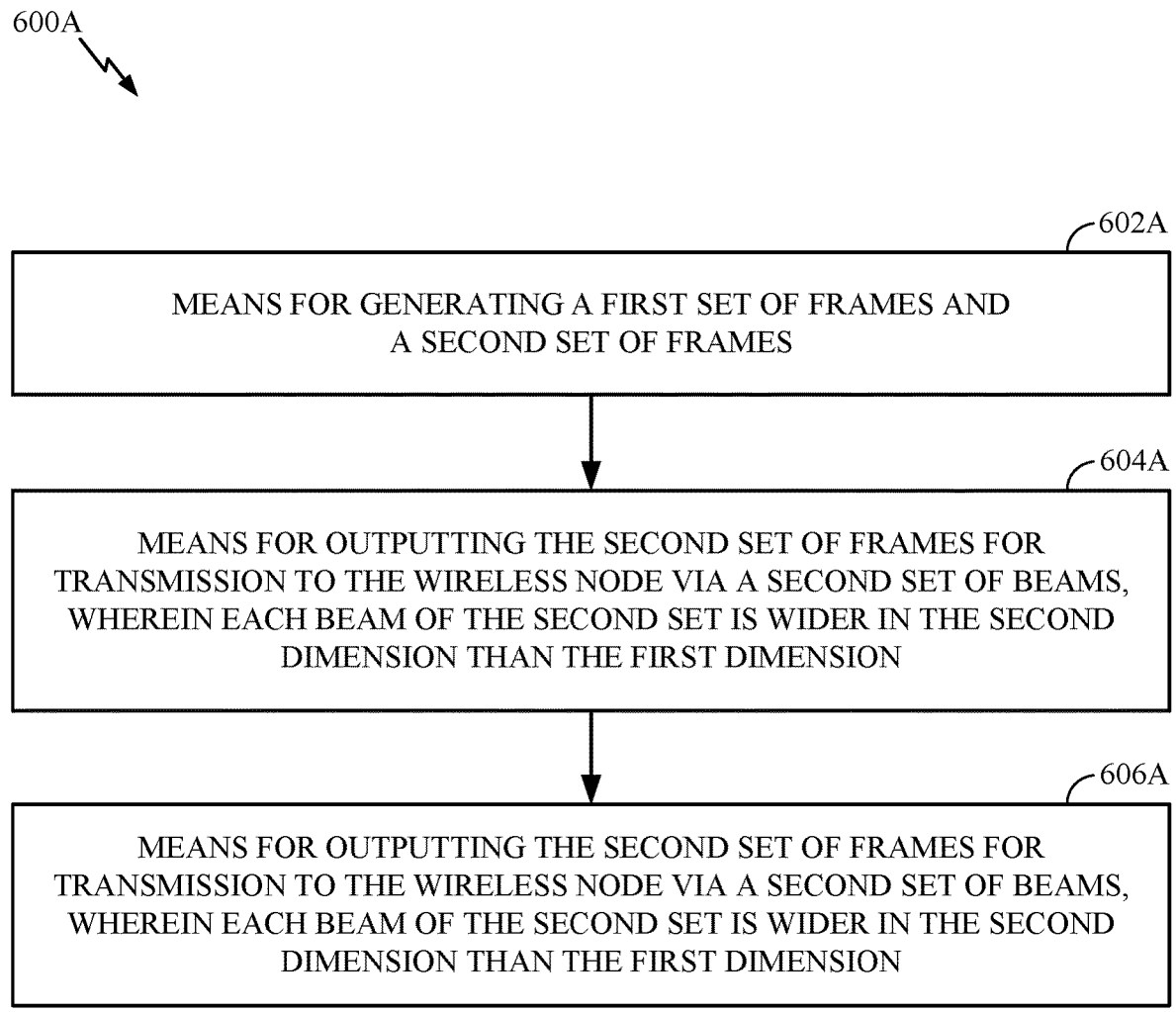
FIG. 6A illustrates example components capable of performing the operations shown in FIG. 6, in accordance with certain aspects of the present disclosure.
Figure 7A:
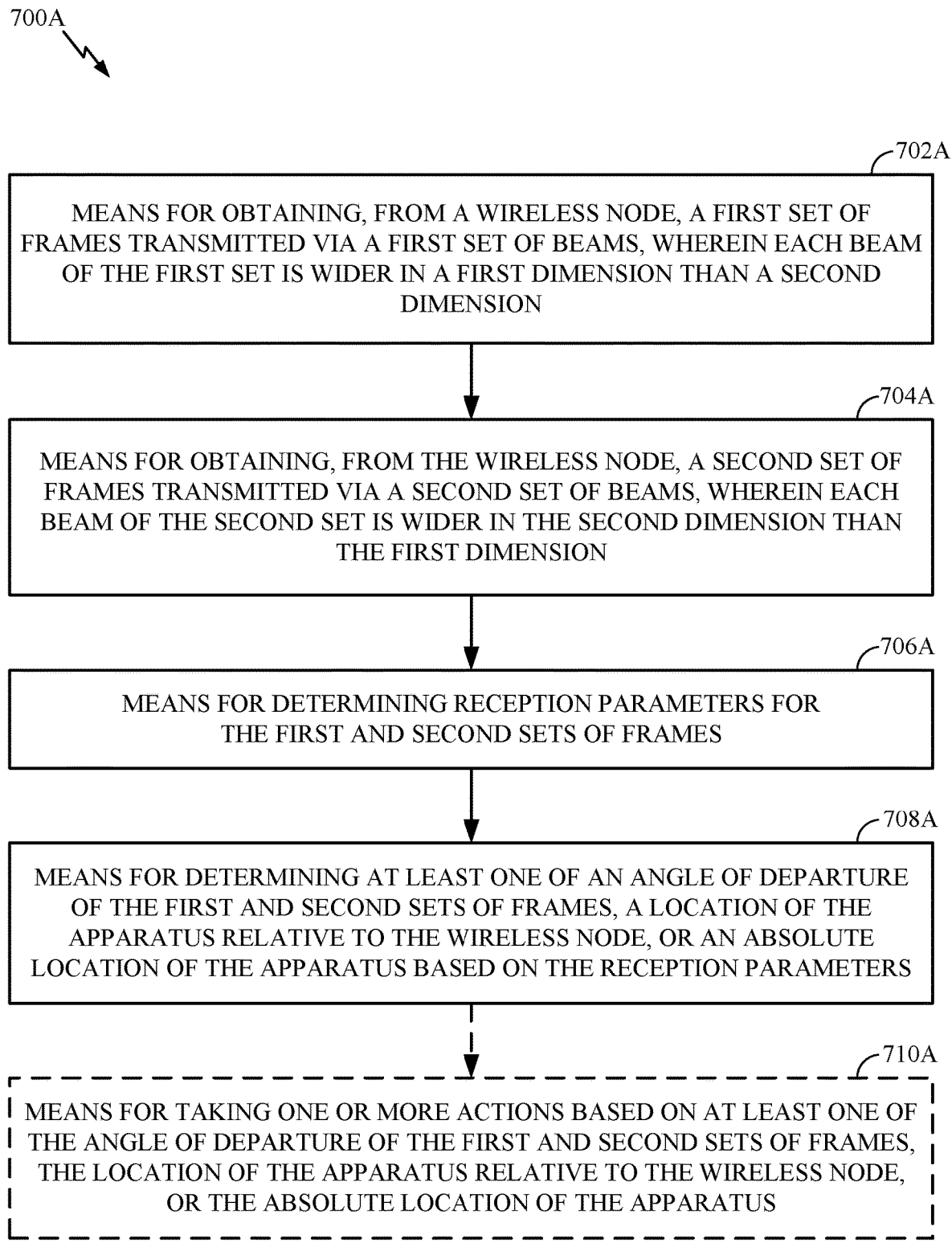
FIG. 7A illustrates example components capable of performing the operations shown in FIG. 7, in accordance with certain aspects of the present disclosure.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 600 and 700 illustrated in FIGS. 6 and 7 correspond to means 600A and 700A illustrated in FIGS. 6A and 7A.

Means for receiving, means for taking one or more actions, means for changing an antenna configuration, or means for obtaining may comprise a receiver (e.g., the receiver unit 222) and/or an antenna(s) 224 of the access point 110 or the receiver unit 254 and/or antenna(s) 252 of the user terminal 120 illustrated in FIG. 2. Means for transmitting, means for taking one or more actions, means for reporting, means for changing an antenna configuration, or means for outputting may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for generating, means for determining, means for logging, means for taking one or more actions, means for reporting, means for changing an antenna configuration, means for outputting, or means for obtaining may comprise a processing system, which may include one or more processors, such as the RX data processor 242, the TX data processor 210, the TX spatial processor 220, RX spatial processor 240, and/or the controller 230 of the access point 110 or the RX data processor 270, the TX data processor 288, the TX spatial processor 290, RX spatial processor 260, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a first interface configured to obtain, from a wireless node,
    a first set of frames transmitted via a first set of beams, wherein each beam of the first set is wider in a first dimension than a second dimension, and
    a second set of frames transmitted via a second set of beams, wherein each beam of the second set is wider in the second dimension than the first dimension; and
a processing system configured to:
    determine reception parameters for the first and second sets of frames, and
    determined based on the determined reception parameters at least one of an angle of departure of the first and second sets of frames, a location of the apparatus relative to the wireless node, or an absolute location of the apparatus.

2. The apparatus of claim 1, wherein the processing system is configured to take one or more actions based on at least one of the angle of departure of the first and second sets of frames, the location of the apparatus relative to the wireless node, or the absolute location of the apparatus.

3. The apparatus of claim 2, wherein the one or more actions comprise changing an antenna configuration or reporting at least one of the location of the apparatus relative to the wireless node or the absolute location of the apparatus.

4. The apparatus of claim 1, wherein:
each frame of the first and second sets has a beam index indicating a beam via which the frame was output for transmission;
beam indexes in the first set of frames map to angles of departure from the wireless node in the second dimension;
beam indexes in the second set of frames map to angles of departure from the wireless node in the first dimension; and
the determination of the angle of departure is based on a combination of the beam index of at least one of the first set of frames and the beam index of at least one of the second set of frames.

5. The apparatus of claim 4, wherein the determination of the angle of departure is based on at least one of:
an interpolation between two of the angles in the second dimension; or
an interpolation between two of the angles in the first dimension.

6. The apparatus of claim 4, wherein the first interface is further configured to obtain at least one frame with information regarding the mapping of the beam indexes in the first set of frames and the mapping of the beam indexes in the second set of frames.

7. The apparatus of claim 6, wherein the at least one frame is obtained from the wireless node or another wireless node.

8. The apparatus of claim 1, wherein:
each frame of the first and second sets includes an identification of the wireless node; and
the processing system is configured to determine an absolute location of the wireless node based on the identification and determine the absolute location of the apparatus based on the absolute location of the wireless node and the angle of departure.

9. The apparatus of claim 1, further comprising a second interface, wherein:
the processing system is further configured to generate a feedback frame including information regarding the reception parameters;
the second interface is configured to output the feedback frame for transmission to the wireless node;
the first interface is further configured to obtain, from the wireless node, a response frame; and
the determination of the angle of departure is based on information included in the response frame.

10. A method for wireless communication by an apparatus, comprising:
obtaining, from a wireless node,
    a first set of frames transmitted via a first set of beams, wherein each beam of the first set is wider in a first dimension than a second dimension, and a second set of frames transmitted via a second set of beams, wherein each beam of the second set is wider in the second dimension than the first dimension;

determining reception parameters for the first and second sets of frames; and determined based on the determined reception parameters at least one of an angle of departure of the first and second sets of frames, a location of the apparatus relative to the wireless node, or an absolute location of the apparatus.

11. The method of claim 10, further comprising taking one or more actions based on at least one of the angle of departure of the first and second sets of frames, the location of the apparatus relative to the wireless node, or the absolute location of the apparatus.

12. The method of claim 11, wherein the one or more actions comprise changing an antenna configuration or reporting at least one of the location of the apparatus relative to the wireless node or the absolute location of the apparatus.

13. The method of claim 10, wherein:

each frame of the first and second sets has a beam index indicating a beam via which the frame was output for transmission;

beam indexes in the first set of frames map to angles of departure from the wireless node in the second dimension;

beam indexes in the second set of frames map to angles of departure from the wireless node in the first dimension; and the determination of the angle of departure is based on a combination of the beam index of at least one of the first set of frames and the beam index of at least one of the second set of frames.

14. The method of claim 13, wherein the determination of the angle of departure is based on at least one of:

an interpolation between two of the angles in the second dimension; or an interpolation between two of the angles in the first dimension.

15. The method of claim 13, further comprising obtaining at least one frame with information regarding the mapping of the beam indexes in the first set of frames and the mapping of the beam indexes in the second set of frames.

16. The method of claim 15, wherein the at least one frame is obtained from the wireless node or another wireless node.

17. The method of claim 10, further comprising:

determining an absolute location of the wireless node based on an identification of the wireless node included in each frame of the first and second sets; and determining the absolute location of the apparatus based on the absolute location of the wireless node and the angle of departure.

18. The method of claim 10, further comprising:

generating a feedback frame including information regarding the reception parameters;

outputting the feedback frame for transmission to the wireless node;

obtaining, from the wireless node, a response frame; and the determination of the angle of departure is based on information included in the response frame.

* * * * *